United States Patent Office 2,713,666
Patented July 19, 1955

2,713,666
REACTOR

Wayne Lee Roy Henderson, Fort Wayne, Ind., assignor to General Electric Company, a corporation of New York Application February 19, 1954, Serial No. 411,440

4 Claims. (Cl. 336—160)

This invention relates to reactors and more particularly to a reactor having two coils mounted on a single core adaptable for use as either a single reactor or as two separate reactors.

The designer of ballasting devices for arc discharge devices, for example mercury vapor lamps, is confronted with certain circuits which require two reactors and with other circuits which require only a single reactor. In the past, in instances where two reactors were required, two separate reactors each having an individual core and coil were provided. It is desirable, however, in order to effect maximum economy of material and space to provide a reactor construction incorporating two separate reactors on a common core. Furthermore, in order to reduce the number of models of reactors which must be supplied, it is desirable that such a reactor be adaptable for use with a number of circuits, for example two reactors in parallel supplying a single load, two reactors in series supplying a single load, or two reactors supplying separate loads. In the case of the latter requirement, i. e. two reactors supplying separate loads, it is also desirable that the device be adaptable for supplying both loads with lagging current, both loads with leading current or one lagging current and one leading current load. It is therefore necessary that the device be adaptable to provide two air gaps of uniform width, or in the alternative two air gaps of unequal width.

It is therefore an object of this invention to provide an improved reactor construction incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broadest aspects provides a reactor having a shell type core with a center leg portion and an outer yoke portion joining the ends of the center leg and defining a coil window on either side thereof. One of the portions has a pair of projections respectively extending therefrom into the core windows toward the other of the portions and defining air gaps therewith. A pair of reactor coils are respectively positioned on the projections and respectively arranged in the coil windows. The arrangement thus far described provides a reactor with two reactor coils which may be separately connected in series with two separate loads, or which in the alternative may be connected in parallel to supply one load or in series to supply one load. In order to provide for supplying leading power factor current to one load and lagging power factor current to another load, the two projections may be made of unequal length and a notch is formed in one of the portions toward which one of the projections extends. The center leg portion may then be selectively positionable so that either the longer or shorter projection is adjacent the notch so that the air gaps may selectively be made of equal width or of unequal width.

In the drawing, Fig. 1 is a view in perspective showing the improved reactor of this invention;

Fig. 2 is a plan view of the core of the reactor of this invention showing the center leg in one position;

Fig. 3 is a view similar to Fig. 2 showing the center leg in its other position;

Fig. 4 is a schematic view showing the two reactor coils connected in parallel to supply a single load;

Fig. 5 is a schematic view showing the two reactors connected in series to supply a single load;

Fig. 6 is a schematic view showing the two reactors connected for supplying separate loads; and Fig. 7 is a schematic view showing the two reactors connected to supply two separate loads, one with leading power factor current and the other with lagging power factor current.

Referring now to Figs. 1, 2 and 3 of the drawing, there is shown a reactor having a core member generally identified as 1. Core member 1 is preferably of the shell type and in the illustrated embodiment includes a yoke portion 2 formed of a plurality of stacked relatively thin laminations of magnetic material, and a center leg member 3 likewise formed of a plurality of stacked relatively thin laminations of magnetic material. Yoke member 2 in the illustrated embodiment includes side leg portions 4 and 5 and end leg portions 6 and 7 which join the side leg portions 4 and 5. End leg portions 6 and 7 are preferably notched on their inner edges, as at 8 and 9 respectively and ends 10 and 11 of center leg portion 3 are respectively seated therein, thus magnetically joining center leg portion 3 to the yoke portion 2. Center leg portion 3 thus respectively defines coil windows 27 and 28 with yoke portion 2.

Center leg portion 3 is provided with two integral projections 12 and 13 formed on either side thereof and extending respectively into coil windows 27 and 28 toward side legs 4 and 5. Projection 12 is shorter than projection 13 and a notch 14 is formed in the inner edge of side leg 5 in alignment with projections 12 and 13. Suitable holes 15 are formed in yoke portion 2 to accommodate through-bolts 16 for holding the yoke laminations in assembled relation and suitable holes 17 are formed in center leg 3 and its projections 12 and 13 to accommodate through-bolts 16 for holding the center leg laminations in assembled relation. Notches 18 may be formed in the outer edges of end portions 6 and 7 for mounting the complete reactor in an enclosing case (not shown).

Referring now specifically to Fig. 2, it is seen that the shorter projection 12 extends toward side leg 4 of yoke 2 while the longer end leg 13 extends toward notch 14 in side leg 5. If projection 12 is made shorter than projection 13 by the amount of indentation of notch 14 from the inner edge of side leg 5, it will be apparent that in the position shown in Fig. 2, the air gap 19 defined between projection 12 and side leg 4 will be equal in width to the air gap 20 defined between projection 13 and notch 14 in side leg 5.

Referring now specifically to Fig. 3, it will be seen that by merely reversing the position of center leg 3 so that the longer leg 13 extends toward side leg 4 and the shorter leg 12 extends toward notch 14 in side leg 5, the air gap 19 has been made much smaller while the air gap 20 has been made much larger so that the air gaps are now unequal.

In order to complete the assembly, a pair of reactor coils 21 and 22 are respectively positioned on projections 12 and 13 of center leg member 3 in coil windows 27 and 28.

Referring now to Figs. 4, 5, 6 and 7, it will be seen that

July 19, 1955  D. O. SCHWENNESEN  2,713,667
AUDIO FREQUENCY TRANSFORMER
Filed Dec. 21, 1953
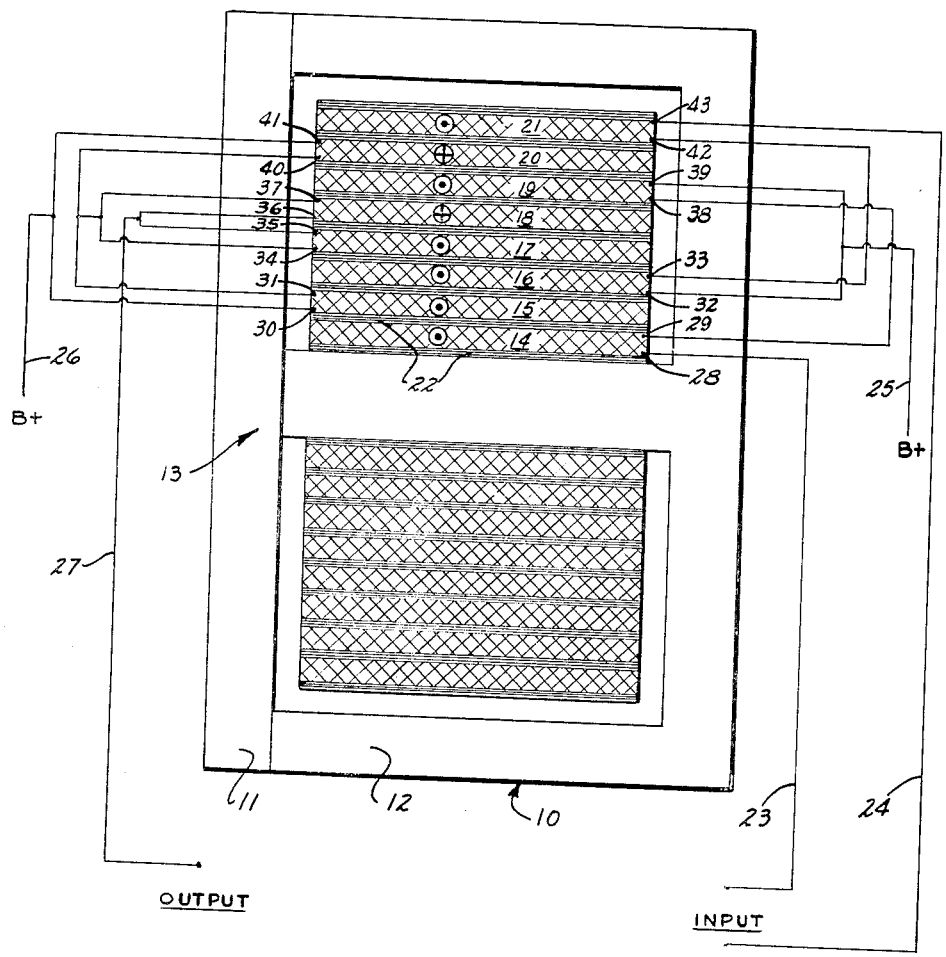
OUTPUT        INPUT
INVENTOR.
DONALD O. SCHWENNESEN
BY
Harry C. Riley
ATTORNEY